(12) United States Patent
Appel et al.

(10) Patent No.: US 11,368,083 B2
(45) Date of Patent: Jun. 21, 2022

(54) METHOD AND DEVICE FOR DISCHARGING A DC-LINK CAPACITOR

(71) Applicant: ZF Friedrichshafen AG, Friedrichshafen (DE)

(72) Inventors: Sebastian Appel, Friedrichshafen (DE); Manuel Schwab, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 275 days.

(21) Appl. No.: 16/280,856

(22) Filed: Feb. 20, 2019

(65) Prior Publication Data
US 2019/0260286 A1 Aug. 22, 2019

(30) Foreign Application Priority Data
Feb. 22, 2018 (DE) .................... DE102018202661.0

(51) Int. Cl.
*H02J 7/00* (2006.01)
*H02M 1/32* (2007.01)
*H02J 7/34* (2006.01)
*H02M 7/219* (2006.01)
*H02M 7/5387* (2007.01)

(52) U.S. Cl.
CPC .............. *H02M 1/32* (2013.01); *H02J 7/345* (2013.01); *H02M 7/219* (2013.01); *H02M 7/5387* (2013.01); *H02M 1/322* (2021.05)

(58) Field of Classification Search
CPC ........................................................ H02M 1/32
USPC ........................................................... 320/166
See application file for complete search history.

(56) References Cited

U.S. PATENT DOCUMENTS

| | | | | |
|---|---|---|---|---|
| 2011/0235221 | A1* | 9/2011 | Vogeli | H02M 1/32 361/18 |
| 2012/0147634 | A1* | 6/2012 | Jones | H02M 5/458 363/37 |
| 2015/0236616 | A1* | 8/2015 | Aldinger | H02M 1/32 363/97 |
| 2017/0047856 | A1* | 2/2017 | Luscher | H02M 1/32 |
| 2018/0013290 | A1* | 1/2018 | Outram | H02J 7/0068 |

FOREIGN PATENT DOCUMENTS

DE 102013213802 A1 1/2015

* cited by examiner

*Primary Examiner* — Yalkew Fantu
(74) *Attorney, Agent, or Firm* — Crowell & Moring LLP

(57) ABSTRACT

A method for the discharging a DC-link capacitor includes electrically coupling the DC-link capacitor to at least one half-bridge, wherein the half-bridge comprises at least two switches and that are connected in series. The method includes at least one step in which the switches and of the half-bridge are controlled in order to carry out a simultaneous closing of the switches.

12 Claims, 6 Drawing Sheets

METHOD AND DEVICE FOR DISCHARGING A DC-LINK CAPACITOR

RELATED APPLICATIONS

This application claims the benefit of priority under 35 U.S.C. § 119(a) of German Application No. 10 2018 202 661.0, filed Feb. 22, 2018, the content of which is incorporated herein by reference in its entirety.

FIELD

The present solution relates to a method and a device for the discharging of a DC-link capacitor according to the main claims.

DESCRIPTION OF RELATED ART

In inverters for electrical machines a DC-link capacitor is usually installed, which caches the electrical energy in the inverter that is to be converted. For high power inverters, the capacitance and/or the charging voltage may rise to high values. A large amount of the electrical energy is thereby stored along with a high capacitor voltage. This combination of stored energy and voltage requires high demands on the electrical safety of an electrical system.

In the event of an error or when the inverter is switched off, this energy in the DC-link capacitor should be discharged in order to prevent that people come into contact with this voltage. This can e.g. happen when the inverter is to be repaired. In order to carry out this discharging, there are usually two methods which can be used at the same time, wherein a permanently connected slow discharging e.g. by means of passive components usually discharges the DC-link capacitor within 120 seconds.

In the disclosure publication DE 10 2013 213 802 A1, a device and a method for a voltage surge protection for active rectifiers with a load shedding is described.

In this context, the present approach provides an improved method and an improved device for the discharging of a DC-link capacitor according to the main claims. Advantageous embodiments can be derived from the subclaims and from the following description.

The energy that is stored in the DC-link capacitor is transformed into heat in accordance with the proposed solution by means of at least one (first) half-bridge with two switches that are connected in series, wherein a momentary short circuit is brought about by means of the two switches and the voltage and therefore also the energy in the DC-link capacitor is thereby depleted.

SUMMARY

A method for the discharging of a DC-link capacitor is presented, wherein the DC-link capacitor is electrically coupled to at least one (first) half-bridge, which comprises at least or exactly two switches that are connected in series. The method includes a step of actuating the switches of the half-bridge, in order to carry out a simultaneous closing of the switches. The switches are thus switched on at the same time. After that, the switches can be opened again simultaneously.

For the controlling of the respective switch for the discharging of the DC-link capacitor, a so-called discharging pulse can be released to the respective switch. As long as this load discharging pulse continues, the switch is closed. When the load discharging pulse ends, the switch opens subsequently.

The DC-link capacitor can refer to an electrical capacitor in an intermediate circuit of an inverter or to an inverter. The half-bridge can refer to an electrical circuit. For example, the half-bridge is part of the DC-inverter or inverter. Such a switch can refer to an electronic component, such as e.g. to a transistor in the form of an IGBT or MOSFET or the like, which allows for a controlling of electrical voltages and currents. By means of the half-bridge, a closing of the switches makes it possible to carry out a short circuit between two terminals of the DC-link capacitor.

Preferably, the DC-link capacitor is disconnected from a DC power supply prior to or at the same time along with the step of actuating the switches, for example by means of a contactor and/or a switch to disconnect the battery. The DC power supply is designed to supply the DC-link capacitor with electrical power during normal operation.

In one embodiment, the switches can be controlled in such a way during the step of actuating, that a switching-on duration of the switch (duration between the simultaneous closing and a subsequent opening of the switch) does not exceed a predetermined threshold value. This keeps the current flow and the thermal load of the switch to a minimum, preventing that the switch and the DC-link capacitor is being damaged.

In one embodiment, the simultaneous closing and a subsequent (possibly simultaneous) opening of the switches can be repeated several times in the step of actuating. In particular, a consecutive opening and closing of the switches is repeated in predefined (temporal) intervals. The predefined (temporal) intervals are chosen in such a way, that such an interval serves as a cooling period after a switch was closed, so that an overheating of the switch is prevented during a repeated closing of the switch.

In accordance with a design example, it is possible to carry out the (permanent or repeated) closing the switches in the step of actuating, until the DC-link capacitor is discharged. In this way it can be ensured that a threat for people can be kept at a minimum.

According to one embodiment, a further (second) half-bridge can be controlled in the step of actuating, which is connected in parallel to the first half-bridge. This second half-bridge also features at least or exactly two switches that are connected in series. The further half-bridge is designed in particular analogously to the first half-bridge. The switches of the additional half-bridge be closed simultaneously in the step of actuating. The DC-link capacitor can hereby be discharged in a faster way. Analogous to the first half-bridge, the respective switches of the further half-bridge can also be repeatedly closed simultaneously and subsequently opened again.

According to a further embodiment, the switches of the further half-bridge can be controlled with a temporal offset with respect to the switches of the first half-bridge, i.e. be closed and/or opened in the step of actuating. In this way it is possible to achieve that a discharging current from the DC-link capacitor and a corresponding thermal load is evenly distributed among the half-bridges over a period of time. Temporal tolerances of the switching-on pulse for an interconnecting of the switches of the half-bridges will also have a lower impact on the maximum current flow, which reduces the thermal load on the switches on the one hand and further simplifies an adjusting of the switching-on pulse.

One or more additional of suchlike half-bridges can be provided, in particular, exactly one third half bridge. In this way it is possible to particularly create an inverter or DC-inverter with the half-bridge. The step of actuating can hereby be carried out at the same time as the first and/or further half-bridge. A switching of the half-bridges is particularly carried out with a temporal offset, so that, e.g. the switches of the first half-bridge are closed first (and optionally opened again) and only then the switches of the second half-bridge, etc.

In one embodiment, a protection unit of the half-bridge(s) for a monitoring that a state of the switches of the switched-on half-bridge(s) is not switched on more than a maximum switching-on duration, can be deactivated. In this way it can be ensured that an already existing protective function for the preventing of a short circuit of the switches of the half-bridge(s) can not suppress the herein presented solution for the depleting of energy from the DC-link capacitor.

In accordance with one embodiment, it is possible in the step of actuating to deactivate the protection unit for the half-bridges for a predetermined period of time and to re-activate these again after the predetermined period of time has elapsed. In this way it can be ensured that an accidental closing of the switches of one half-bridge is prevented during a "normal" operating mode, in which no short-term depleting of the energy from the DC-link capacitor is required. This contributes to a significantly increased operational reliability in the "normal" operating mode of the DC-link or half-bridge.

In one embodiment, the discharging of the DC-link capacitor can be controlled in the step of actuating, if an error message or an information about the presence of a generator operation of an electrical machine, that is coupled to the half-bridges, is provided. The error message particularly refers to an information regarding an error condition in the intermediate circuit and/or a surge voltage of the DC-link capacitor. As a result, it is possible to increase an electrical safety of the electrical system which comprises the DC-link capacitor.

The usage of the herein proposed solution is preferred during emergencies, such as particularly in cases of a load-shedding, in which an electrical energy (voltage) has to be depleted from the DC-link capacitor on short notice and quickly. Such an emergency particularly occurs if a load shedding takes place during a generator operation of an electrical engine that is coupled to the half-bridge(s).

The embodiments of the proposed method can be implemented e.g. in software or hardware or in a mixed form of software and hardware, for example in a control device, e.g. in a device of a drive control device of the drive system.

Furthermore, a device is presented, which is configured to carry out and/or control the step(s) of the method in corresponding units/one corresponding unit.

Such a device can refer to an electrical device, which processes electrical signals, e.g. sensor signals and sends out control signals based on these. The device can feature one or more suitable interfaces, which can be configured via hardware and/or software. In a hardware configuration, the interfaces may e.g. be part of an integrated circuit in which functions of the device are implemented. The interfaces may also be individual, integrated circuits or at least partially consist of discrete components. In a software configuration, the interfaces may be software modules, which are provided e.g. on a microcontroller in addition to other software modules.

A computer program product with a program code that can be saved on a machine-readable carrier such as a semiconductor memory, a hard drive or an optical storage and which can be used to carry out the proposed method is also advantageous, if the program is executed on a computer or device.

An electrical system with an electrical machine is furthermore proposed, wherein the electrical system features a half-bridge that is coupled between the electrical machine and a DC-link capacitor as well as the presented device. The electrical system particularly refers to an electric drive system.

The electrical machine particularly refers to an induction machine, such as in particular a synchronous or asynchronous machine. The electrical machine particularly refers to a traction motor of a motor vehicle, or to an electric motor to power the vehicle. The vehicle thus particularly refers to a vehicle that can be powered at least temporarily by means of the electric machine, such as e.g. a purely electric vehicle or a hybrid vehicle. The vehicle particularly refers to a motor vehicle, such as a passenger car or a truck. The subject-matter of the invention can therefore also refer to a drive train or drive system for such a vehicle that is comprising the electric motor.

BRIEF DESCRIPTION OF THE DRAWINGS

Design examples of the herein proposed solution are shown in the drawings and are explained in more detail in the following description. It is shown.

DETAILED DESCRIPTION

In the following description of preferred design examples of the present invention, the same or similar reference signs are used for elements that are depicted and that function in a similar way in the various figures, wherein a repeated description of these elements is omitted.

If a design example comprises an "and/or" linkage between a first characteristic and a second characteristic, this can be read in such a way that the design example according to one embodiment features both the first characteristic as well as the second characteristic and according to another embodiment, either only the first characteristic or only the second characteristic.

Figure 1:
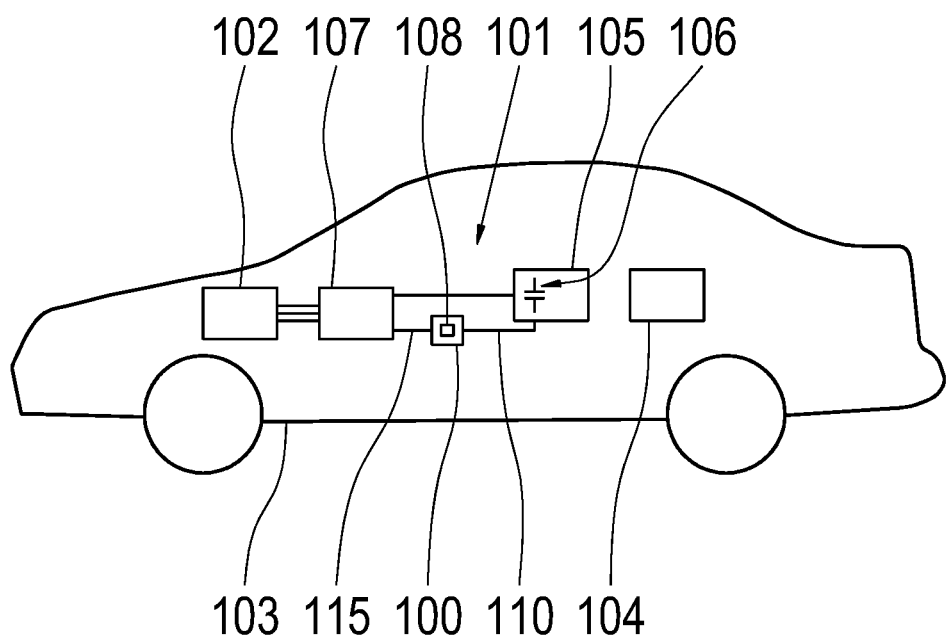
FIG. 1 a schematic depiction of a device for the discharging of a DC-link capacitor in accordance with a design example.

FIG. 1 shows a schematic depiction of a device 100 for the discharging of a DC-link capacitor 106 in accordance with a design example in interaction with further components. Device 100 is part of an electrical system 101 comprising an electric machine 102. This electrical system 101 can e.g. be used in a vehicle 103, in which an electrical energy storage 104 can transfer electrical energy via an intermediate circuit 105 comprising the DC-link capacitor 106 and an inverter 107 to the electrical machine 102, for example, in order that the vehicle 103 can drive. The electrical machine 102 thus particularly refers to a traction motor of a motor vehicle 103. Thus, system 101 particularly refers to an electric drive system. Vehicle 103 particularly refers to a motor vehicle.

Device 100 is provided, in order to prevent that a damage of components, e.g. of the intermediate circuit 105, occurs in the case of an error or in the case of a load shedding. It is designed to carry out and/or control a method for the discharging of a DC-link capacitor 106 in the corresponding units.

Device 100 comprises a control unit 108, wherein the control unit 108 is configured, for example, to import an error signal 110. Error signal 110 represents e.g. an error message or a load-shedding notification, which represents an overvoltage in the intermediate circuit 105 and/or at the DC link capacitor 106. Error message 110 can alternatively or additionally represent a generator operation of the electric motor 102 as it occurs e.g. in the case of the recuperative braking of vehicle 103. This is the case, because if an error occurs on the part of the intermediate circuit 105 during the generator operation of the electric machine 102, e.g. due to an emergency isolating of the energy storage 104 that is to be charged by means of the electric machine 102 via the intermediate circuit 105, then the energy that was supplied by the electric machine 102 would possibly cause damages in the intermediate circuit 105 or to the components of the intermediate circuit 105 such as to the DC-link capacitor 106. Control unit 105 is therefore designed to release a control signal 115 in response to error signal 110.

Control signal 115 represents an order to carry out a simultaneous closing and possibly subsequent opening of the switches of a half-bridge, which is described in more detail in the following. This half-bridge is preferably part of the inverter 107. A discharging of the DC-link capacitor 106 in this design example is therefore especially initiated when the error message refers to an overvoltage of the DC-link capacitor and/or to an emergency.

Figure 2:
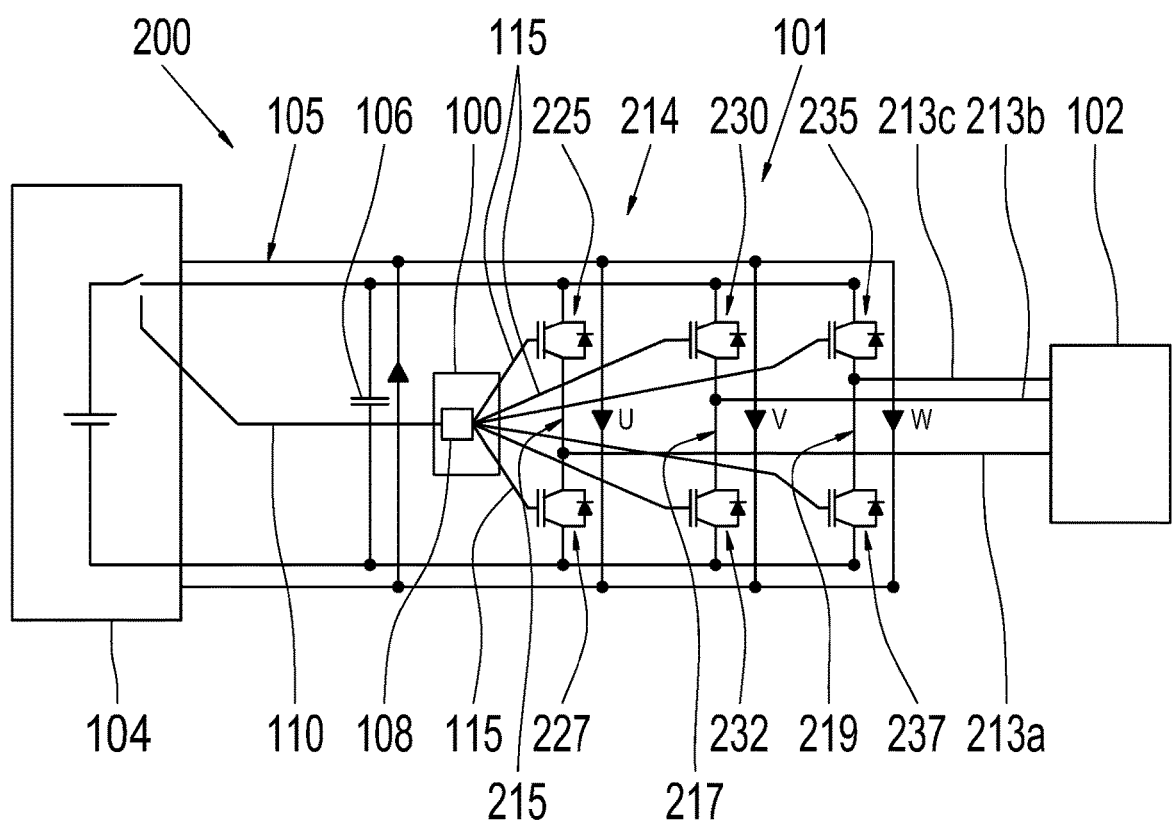
FIG. 2 a schematic depiction of a circuit layout for the discharging of a DC-link capacitor in connection with an electric machine in accordance with a design example.

FIG. 2 shows a schematic depiction of a circuit layout 200 as an electrical system 101, comprising a device 100 for the discharging of a DC-link capacitor 106. Caircuit layout 200 comprises the electric machine 102 that can be operated in the generator mode and which thus provides an electrical voltage and electrical current. The electrical system 101 furthermore comprises an intermediate circuit 105 with the DC-link capacitor 106, wherein the intermediate circuit 105 is connected to a high-voltage battery as energy storage 104 (which is more generally understood to be an electrochemical energy storage 104 in this case). It can be recharged by means of e.g. the electrical energy that is supplied by the electrical machine 102, so that it can in turn provide electrical energy to the electrical machine 102 for the driving motion of vehicle 103 in the following.

In the present case, the electrical machine 102 is electrically coupled to the intermediate circuit 105 via the inverter 107 by means of three phase lines 212*a*, 212*b* and 212*c* (U, V and W) in a generally well-known manner. Inverter 107 features three half-bridges 215, 217, 219 (one half-bridge 215, 217, 219 for each one of the phase lines U, V, W).

The half bridges 215, 217 and 219 are electrically interconnected in parallel. Each one of the half-bridges 215, 217, 219 comprises two switches 225 and 227, 230 and 232, 235 and 237, which are connected in series (with reference to two poles/terminals of the intermediate circuit 105). These are respectively one high-side switch 225, 230, 235 and a low-side switch 227, 232, 237.

The switches 225 and 227, 230 and 232, 235 and 237 of the half-bridges 215, 217, 219 are controlled by means of control unit 108 of device 100 in order to carry out a simultaneous closing of the switches 225 and 227, and/or a simultaneous closing of the switches 230 and 232, and/or a simultaneous closing of the switches 235 and 237.

The switches 225 and 227, 230 and 232, 235 and 237 of the respective half-bridge 215, 217, 219 are hereby controlled in such a way that a switching-on period of the switches 225 and 227, 230 and 232, 235 and 237 does not exceed a predetermined (switching-on period) threshold. The closing and subsequent opening of the switches 225 and 227, 230 and 232, 235 and 237 is repeated several times, in particular at predefined time intervals. This is carried out until the DC-link capacitor 106 is completely discharged.

All switches 225 and 227, 230 and 232, 235 and 237 of the half-bridges 215, 217, 219 are particularly controlled in this manner. However, a specific application is also possible, in which only the switches 225 and 227, 230 and 232, 235 and 237 of one of the half-bridges 215, 217, 219 or of two of the half-bridges 215, 217, 219 is closed in this manner and subsequently opened. The technical function of such an opening and closing is analogous to the opening and closing of the switches 225 and 227, 230 and 232, 235 and 237 of all the half-bridges 215, 217, 219 of inverter 107. However, this causes lower current flows and thus a slower discharging of the DC-link capacitor 106. Another possibility is an offset in the controlling of the switches 225 and 227, 230 and 232, 235 and 237 of the individual half-bridges 215, 217, 219. As a result, a smoother graph of the current flow during the discharging of the DC-link capacitor 106 can be achieved.

DC-link capacitor 106 is thus discharged in that the electrical energy of the DC-link capacitor 106 is converted into heat by means of the switches 225 and 227, 230 and 232, 235 and 237 of the (temporarily) short-circuited half-bridges 215, 217, 219. In accordance with one design example, the switches 225 and 227, 230 and 232, 235 and 237 are (power) transistors, such as IGBTs or MOSFETs.

When a discharging of the DC-link capacitor 106 is requested, then—in accordance with one embodiment—all switches 225 and 227, 230 and 232, 235 and 237 are opened with one simultaneous discharging pulse and closed again. As a result, while the switches 225 and 227, 230 and 232, 235 and 237 are interconnected, a current sets in directly from the positive potential connection of the intermediate circuit 105 or of the DC-link capacitor 106 to the negative potential connection of the intermediate circuit 105 or of the DC-link capacitor 106. This leads to a discharging of the DC-link capacitor 106. In this case, this current does not flow via the electric machine 102 as it is otherwise often the case and can thus not generate any undesired torques. During this discharging pulse, only the inductance of the current path limits the increase of the current. Since the inductance is usually very low, high current increase rates can be expected. Since high currents can damage the switches 225 and 227, 230 and 232, 235 and 237 of the half-bridges 215, 217 and 219 as well as the DC-link capacitor 106, this increase in current should be kept low.

This can be achieved by means of reducing the switching-on duration of the switches 225 and 227, 230 and 232, 235 and 237.

In most cases, the DC-link capacitor 106 cannot be completely discharged with a single switching-on and off of the switches 225 and 227, 230 and 232, 235 and 237, since the switching-on period of the switches 225 and 227, 230 and 232, 235 and 237 is to be selected to be short. In order to increase the energy conversion, the discharging pulse is repeated sufficiently often in short intervals until the DC-link capacitor 106 is completely or sufficiently discharged.

The advantage of using one or several half-bridges 215, 217 and 219 of an inverter 107 comprising at least two respective switches 225 and 227, 230 and 232, 235 and 237 is that these components are usually compatible for high power dissipation and a heat dissipation is optimally designed. Additionally, the half-bridges 215, 217 and 219 with the switches 225 and 227, 230 and 232, 235 and 237 are usually already included and thus cause no additional costs for the discharging function. The proposed solution is furthermore characterized in that no current flows through the electrical machine 102 during the discharging process. As a result, no faulty torque can be initiated.

Figure 3:
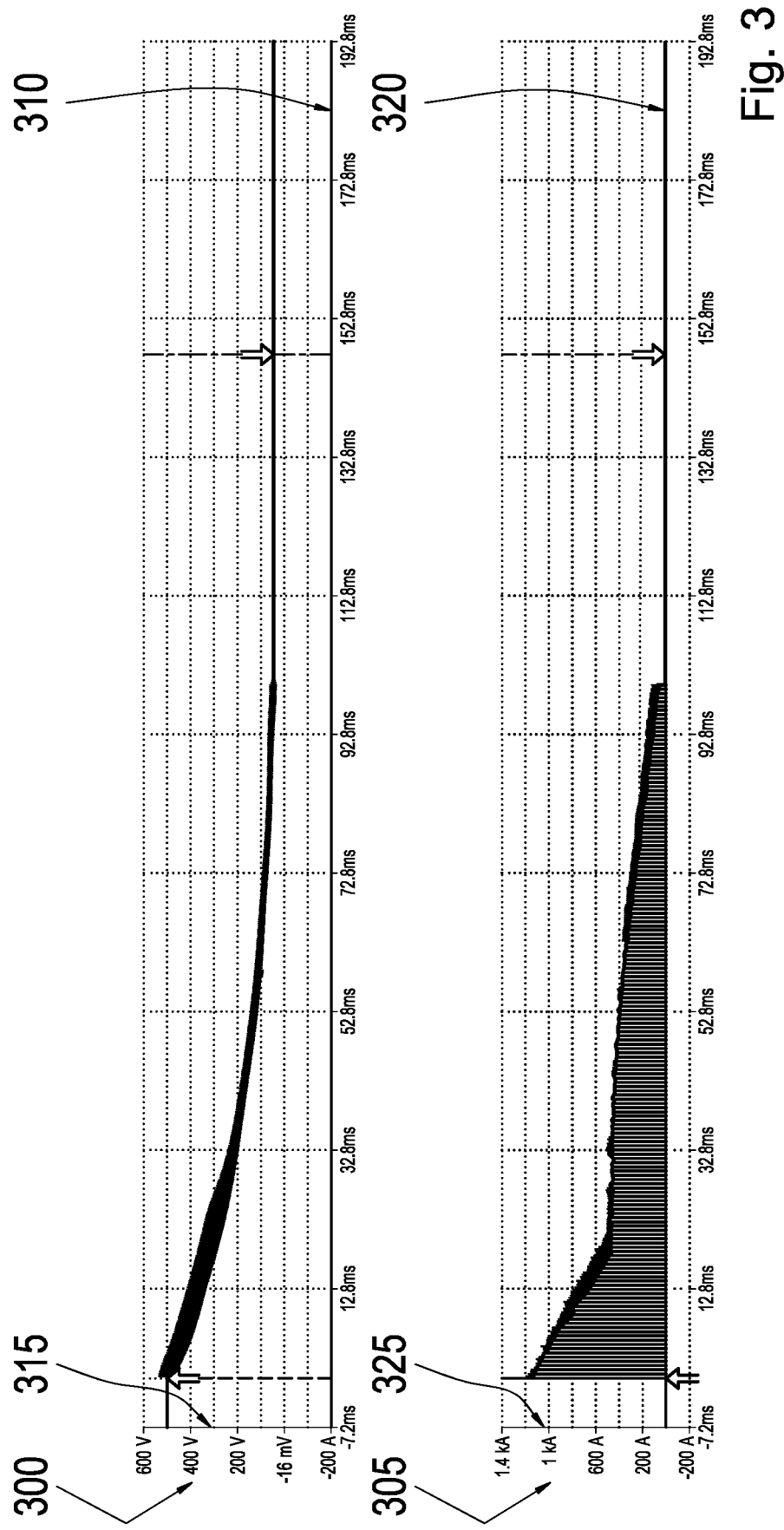
FIG. 3 a first and a second diagram with temporal voltage and current graphs, which have been captured in the process of the discharging of a DC-link capacitor.

FIG. 3 depicts a first and a second diagram 300, 305 with temporal voltage and current strength graphs, which have been captured in the process of the discharging of a DC-link capacitor 106 by means of the suggested solution.

The first diagram 300 shows a time-voltage graph, wherein the x-axis 310 comprises a time graph ranging from −7.2 ms to 192.8 ms and the y-axis 315 a voltage ranging from −200V to 600V. The graph that can be seen in the first diagram 300 describes an intermediate circuit voltage at the DC-link capacitor 106. In the first diagram, the voltage is at the outset (left arrow) at 500V and is discharged after 100 ms to a voltage of 0V. The voltage across the DC-link capacitor 106 drops in a basically exponential manner.

The second diagram 305 shows a time-current strength graph, wherein the x-axis 320 comprises a time graph ranging from −7.2 ms to 192.8 ms and the y-axis 325 a current strength ranging from −200 A to 1.4 kA. The graphs that can be seen in the second diagram 305 describe electric currents that flow during the discharging by means of the half-bridges 215, 217, 219. In the second diagram, the current strength of the currents is at 1.2 kA at the outset (left arrow) and reduces to a current strength of 0A after 100 ms. The drop of the current strength is initially big, but it gets ever lesser with the increase of time. After a duration of 50 ms, the strength of the currents has dropped to lesser than 50%, or below 600 A (approx. 400 A).

Figure 4:
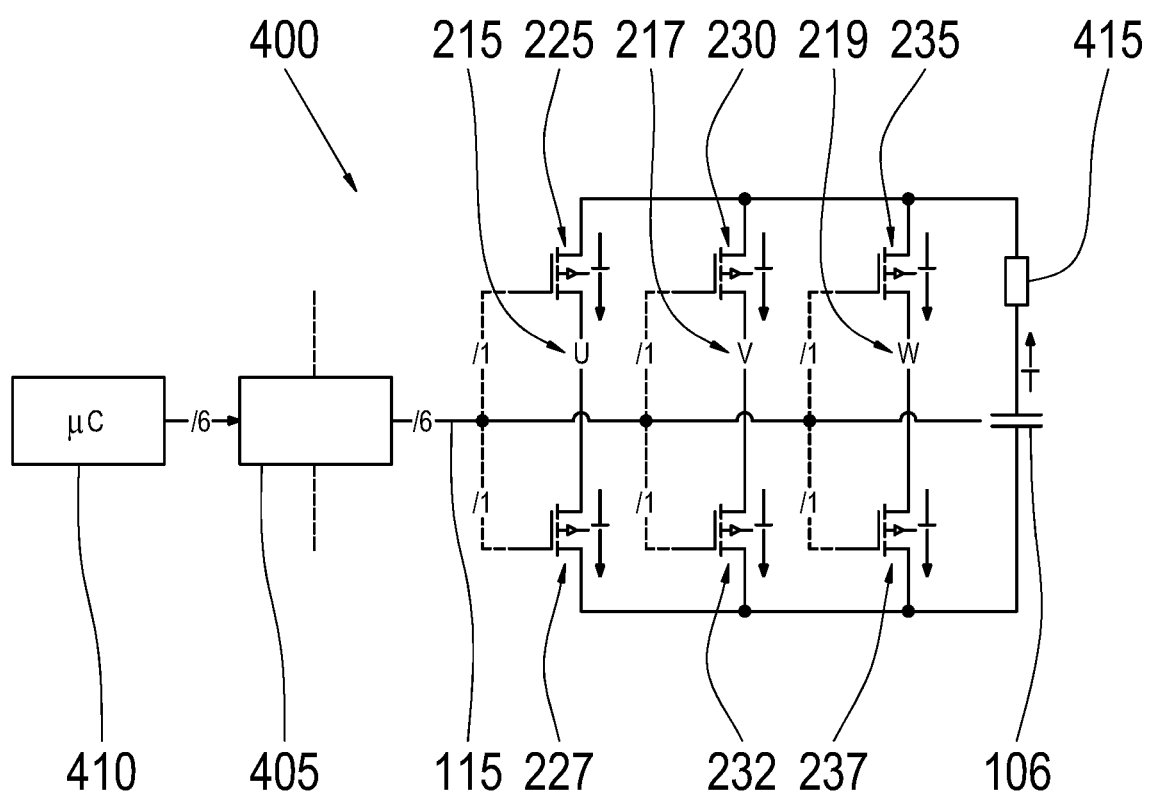
FIG. 4 a schematic depiction of a circuit layout for the discharging of a DC-link capacitor in connection with an electric machine in accordance with a design example.

FIG. 4 shows a schematic depiction of a circuit layout 400 for the discharging of a DC-link capacitor 106 for a not explicitly depicted electrical machine 102. In like manner as in FIG. 2, the DC-link capacitor 106 is electrically coupled to three half-bridges 215, 217, 219 of an inverter in the circuit layout 400. The half bridges 215, 217, 219 are electrically interconnected in parallel. Each one of the half-bridges comprises at least two switches 225 and 227, 230 and 232, 235 and 237, which are connected in series.

Circuit layout 400 further includes the phase lines U, V and W for the supplying of power to and from the electrical machine 102. Each one of the lines U, V and W is coupled to a central tab point of the corresponding half-bridge 215, 217, 219 with the two switches 225 and 227, 230 and 232, 235 and 237 (that are connected in series) of the corresponding half-bridges 215, 217, 219, as it is also depicted in FIG. 2.

Circuit layout 400 further comprises the driver for the half-bridges 405 for the amplification of the control signals 115, which control the switches 225 and 227, 230 and 232, 235 and 237. Circuit layout 400 furthermore includes a microcontroller 410 to control the driver for the half-bridges 405. A coil 415 is further depicted in FIG. 4, which represents a power inductance of the circuit layout 400 in the area of the DC-link capacitor 106.

The switches 225 and 227, 230 and 232, 235 and 237 of the half-bridge 215, 217, 219 are controlled in order to carry out the simultaneous closing and subsequent opening of the switches 225 and 227, 230 and 232, 235 and 237, as it was already explained in FIG. 2. The switches 225 and 227, 230 and 232, 235 and 237 are thus controlled in such a way that a switching-on period does not exceed a predetermined threshold. The closing and subsequent opening of the switches 225 and 227, 230 and 232, 235 and 237 is repeated several times at predefined time intervals. This is carried out until the DC-link capacitor 106 is discharged.

Also in this case it is possible to distribute the discharging pulses for the controlling of the two switches 225 and 227, 230 and 232, 235 and 237 of the half-bridges 215, 217, 219 either with a temporal offset to the half-bridges 215, 217, 219 or instead, to release the discharging pulse for all half-bridges 215, 217, 219 at the same time. In this case, a simultaneous switching of the half-bridges 215, 217, 219 is particularly helpful. Since a DC-link capacitor 106 contains a large portion of the line inductance, it limits the maximum current increase. By means of a simultaneous switching of all the half-bridges 215, 217, 219, the maximally occurring current is equally distributed over the half-bridges 215, 217, 219. Thus, also temporal tolerances of the switching-on pulse have a lesser effect on the maximally flowing current. On the one hand, this reduces the load of the switches 225 and 227, 230 and 232, 235 and 237 and on the other hand it simplifies a setting of the switching-on pulse.

Figure 5:
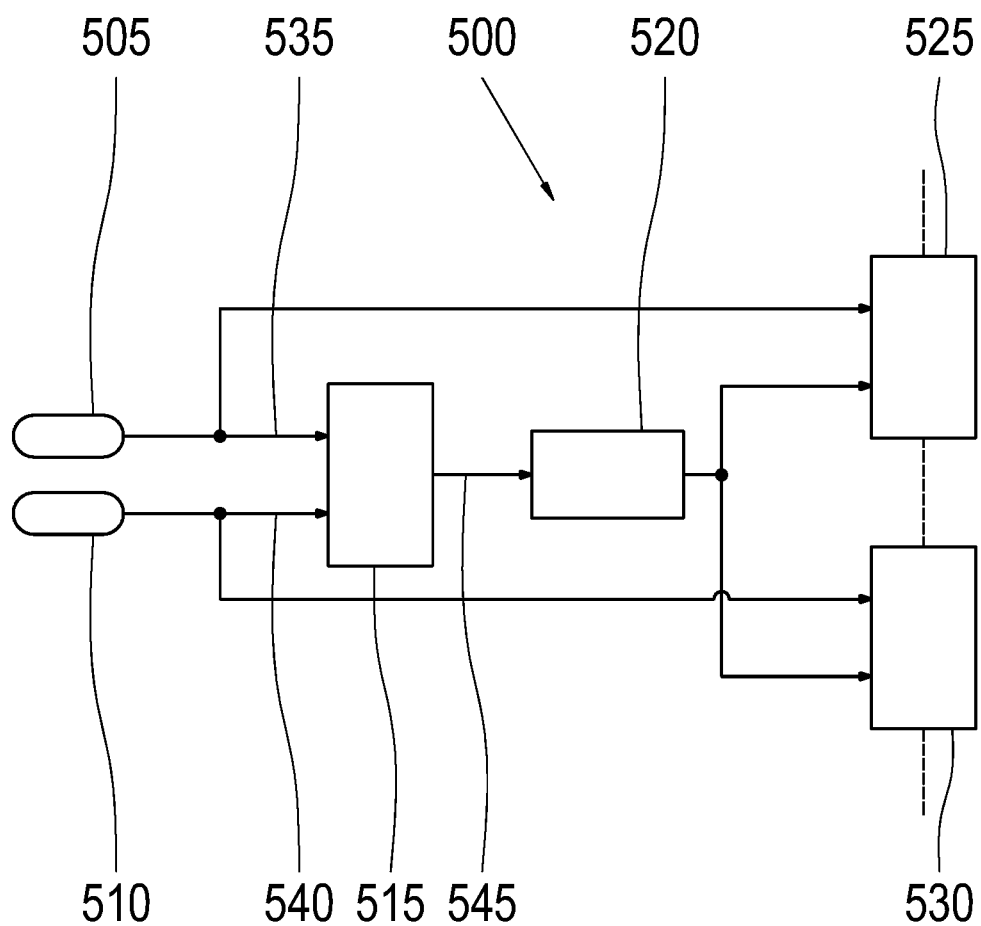
FIG. 5 a schematic depiction of a protection unit of a circuit layout for the discharging of a DC-link capacitor in connection with an electric machine in accordance with a design example.

FIG. 5 shows a circuit layout of a protection unit 500 for the discharging of a DC-link capacitor for an electrical machine by means of two switches of one half-bridge, in particular of the switches of the half-bridges of an inverter. Protection unit 500 can be particularly used for the inverters show in FIG. 2 and FIG. 4, in order to discharge the respective DC-link capacitor.

Protection unit 500 comprises an input 505 for a signal 535 of a high-side pulse width modulation and an input 510 for a signal 540 of a low-side pulse width modulation. These serve to produce pulse width modulated signals, for the opening and closing of the associated switches of the half-bridge. The protection unit furthermore comprises an AND-gate 515, a delaying unit 520 as well as a high-side half-bridge driver 525 and a low-side half-bridge driver 530, which control the respective switch of the half-bridge.

A protection unit is generally provided for half-bridges of inverters, which prevents that the two switches of the half-bridge are not switched-on longer than a maximum switching-on period. The herein suggested solution would be suppressed by means of such a protection unit, since the protection unit would prevent a too long setting of the switching-on pulse for the closing of the switches of the half-bridge. A conventional protection unit usually checks in this regard, whether the high-side switch and the low-side switch are actuated at the same time via corresponding signals at the respective inputs of the protection unit. If this is the case, both switching-on pulses are suppressed with the result that both switches of the half-bridge are inevitably opened. But this function would be suppressed by the presented solution.

The suggested protection unit 500 as it is shown in FIG. 5 is thus carried out in the following manner:

Protection unit 500 compares the two switching signals 535 and 540 of the inputs 505, 510. AND-gate 515 only switches its output to "high" (logical 1) if a "high" (logical 1) is present at both inputs 505, 510. Thus, if both inputs 505, 510 are actuated at the same time (both logical 1), which requests a simultaneous closing of both switches of the half-bridge, a corresponding protective signal 545 is generated. This protective signal 545 is delayed by means of the delaying unit 520. The protective signal 545 is thus released at the output of the delaying unit 520 with a delay of a certain period of time (delay time). The delay time preferably amounts to approx. 500 ns. The delay time is in particular minimally bigger than the time period of the discharging pulse for the discharging of the DC-link capacitor. If the amount of time of the discharging pulse exceeds the delay time, the switches of half-bridge are forcibly switched-off (again) or opened in order to protect them. The two drivers of 525, 530 are correspondingly actuated. If the discharging pulse remains shorter than the delay time, the protection unit 500 does not intervene.

Figure 6:
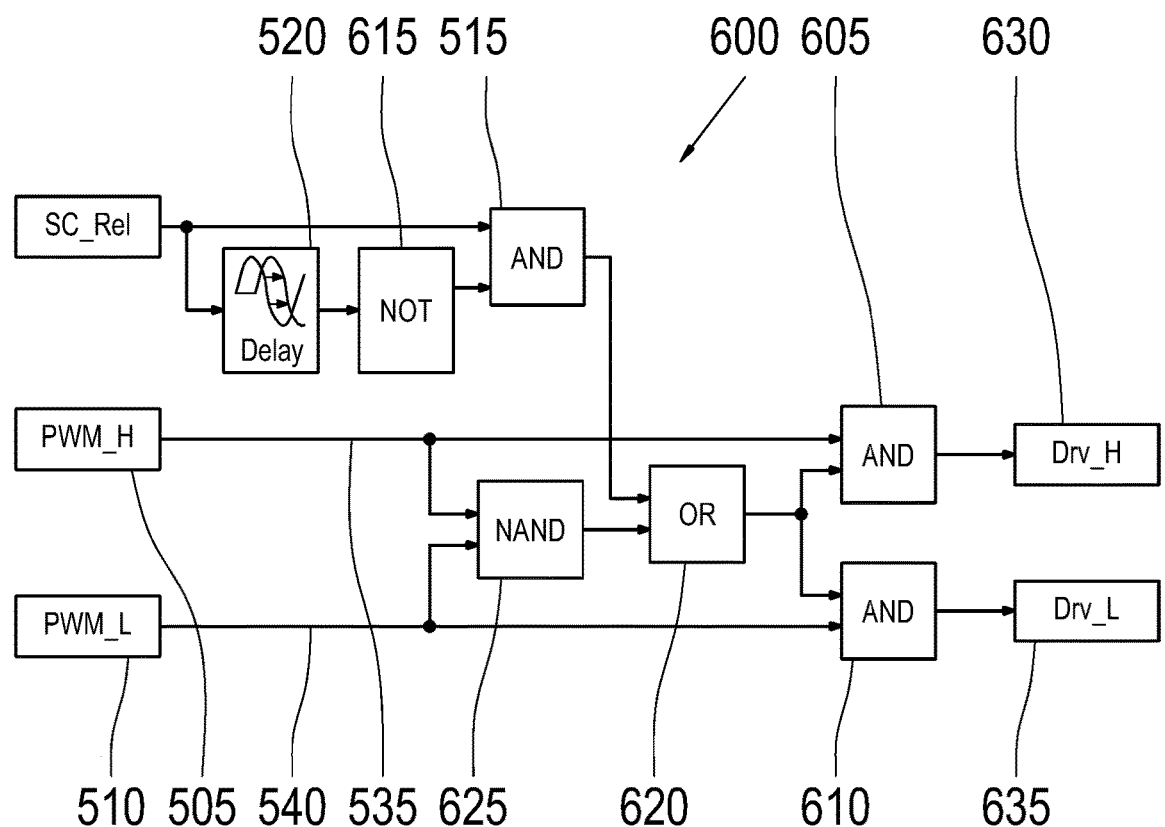
FIG. 6 a schematic depiction of a variant of a protection unit of a circuit layout for the discharging of a DC-link capacitor in connection with an electric machine in accordance with a design example.

FIG. 6 depicts a variant of a protection unit 600 for the discharging of a DC-link capacitor for an electrical machine by means of two switches of a half-bridge, in particular of the switches of the half-bridges of an inverter. This protection unit 600 can be particularly used for the inverters show in FIG. 2 and FIG. 4 as well, in order to discharge the respective DC-link capacitor.

Protection unit 600 comprises an input 505 for a signal 535 of a high-side pulse width modulation and an input 510 for a signal 540 of a low-side pulse width modulation. These serve to produce corresponding pulse width modulated signals with drivers 630, 635, for the opening and closing of the associated switches of the half-bridge. Protection unit 600 further includes three AND-gates 515, 605, 610 and one inverter 615 and one OR-gate 620 and one NAND-gate 625, furthermore one delaying unit 520 as well as the high-side switch driver 630 and the low-side switch driver 635. The drivers 630, 635 to provide the needed power to operate the respective switch of the half-bridge.

In one design example, the herein depicted drivers 630, 635 features a logical output, wherein the elements 515, 605, 610, 615, 620, 625 that are shown here include the before-mentioned respective logic function.

For the protection unit 600 to detect the signals for "high" (logical 1) and "low" (logical 0), certain voltage ranges should be adhered to for these levels. In order that a "1" is detected, the input voltage should particularly amount to more than 70% of an operating voltage. In order that a "0" is detected, the input voltage should particularly not amount to more than 30% of an operating voltage.

Input 505 and input 510 have a locking function which is triggered when both, driver 630 as well as driver 635 are to be switched-on. Protection unit 600 compares the two switching signals 535 and 540 at the inputs 505, 510. NAND-gate 625 hereby only switches its output to "high" (logical 1), if at least one of the switching signals 535, 540 are set to "low" (logical 0). In contrast, NAND-gate 625 switches its output to "low" (logical 0), if both switching signals 535, 540 are set to "high" (logical 1).

Protection unit 600 can be bridged in this variant, if the request "SC_Rel" ("relay contact") is set to "high" (logical "1") by means of e.g. a micro-controller (for example, the microcontroller 410 from FIG. 4). If this is the case, the proposed solution can be used for the discharging of the DC-link capacitor. Because in this case, delaying unit 520 ensures that protection unit 600 is only bridged for a limited time. Delaying unit 520 of protection unit 600 functions in a comparable manner to that of delaying unit 520 or protection unit 500 from FIG. 5. Inverter 615 provides a negation of the signal that is present on its input. This means that after a temporary deactivation of protection unit 600, the signal provided by the AND-gate 515 switches back to "high" (logical 1). The AND-gate 515 sets its output to "high" (logical "1"), if a "high" (logical "1") is present at both inputs.

Figure 7:
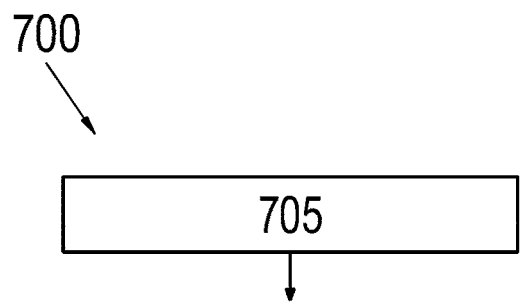
FIG. 7 a flowchart of a design example of a method for the discharging a DC-link capacitor according to a design example.

FIG. 7 depicts a flowchart of a design example of a method 700 for the discharging of a DC-link capacitor according to a design example. Method 700 can be carried out by using one of the devices that were presented in FIG. 1, 2 and FIG. 4, 5, 6.

Method 700 includes at least one step 705 in which the switches of the half-bridge are controlled in order to carry out a simultaneous closing of the switches.

The invention claimed is:

1. A method for discharging of at least one DC-link capacitor, wherein the at least one DC-link capacitor is electrically coupled in parallel with at least a first half-bridge and a second half-bridge, wherein the first half-bridge comprises at least two switches that are connected in series, wherein the second half-bridge comprises at least two additional switches that are connected in series, wherein the method comprises:
   controlling the at least two switches of the first half-bridge to close simultaneously in order to short circuit two terminals of the at least one DC-link capacitor such that the DC-link capacitor discharges directly through both of the at least two switches of the first half-bridge;
   subsequently controlling the at least two switches of the first half-bridge to open simultaneously after having been closed in order to cease the discharge of the at least one DC-link capacitor through the at least two switches of the first half-bridge;
   controlling the at least two additional switches of the second half-bridge to close simultaneously in order to short circuit the two terminals of the at least one DC-link capacitor such that the DC-link capacitor discharges directly through both of the at least two additional switches of the second half-bridge;
   subsequently controlling the at least two additional switches of the second half-bridge to open simultaneously after having been closed in order to cease the discharge of the at least one DC-link capacitor through the at least two additional switches of the second half-bridge; and
   repeating a cycle comprising the preceding four steps in predefined intervals until the at least one DC-link capacitor is substantially discharged,
   wherein the steps of controlling the at least two switches of the first half-bridge to close simultaneously and subsequently controlling the at least two switches of the first half-bridge to open simultaneously are performed with a temporal offset with respect to the steps of controlling the at least two additional switches of the second half-bridge to close simultaneously and subsequently controlling the at least two additional switches of the second half-bridge to open simultaneously such that the at least one DC-link capacitor does not discharge through both of the first half-bridge and the second half-bridge at the same time.

2. The method according to claim 1, further comprising:
   controlling the at least two switches of the first half-bridge to close simultaneously and subsequently open simultaneously such that a time that the at least two switches are closed does not exceed a predetermined threshold value.

3. The method according to claim 2, further comprising:
deactivating a protection unit of the first half-bridge, wherein the protection unit is configured to monitor that a state of the at least two switches of the first half-bridge are not switched on for more than a maximum switching-on duration.

4. The method according to claim 2, further comprising: activating the discharging of the at least one DC-link capacitor in response to at least one of an error message or an information about the presence of a generator operation of an electrical machine that is coupled to the at least the first half-bridge is provided.

5. The method according to claim 1, further comprising:
deactivating a protection unit of the first half-bridge, wherein the protection unit is configured to monitor that a state of the at least two switches of the first half-bridge are not switched on for more than a maximum switching-on duration.

6. The method according to claim 5, further comprising:
reactivating the protection unit after the protection unit has been deactivated for a predetermined period of time.

7. The method according to claim 1, further comprising: activating the discharging of the at least one DC-link capacitor in response to at least one of an error message or an information about the presence of a generator operation of an electrical machine that is coupled to the at least the first half-bridge is provided.

8. The method according to claim 7, wherein the error message refers to an information regarding at least one of an error condition or a surge voltage of the DC-link capacitor.

9. A device comprising:
a controller configured to:
control at least two switches of a first half-bridge to close simultaneously in order to short circuit two terminals of at least one DC-link capacitor electrically coupled in parallel with the first half-bridge such that the DC-link capacitor discharges directly through both of the at least two switches of the first half-bridge;
subsequently control the at least two switches of the first half-bridge to open simultaneously after having been closed in order to cease the discharge of the at least one DC-link capacitor through the at least two switches of the first half-bridge;
control at least two additional switches of a second half-bridge to close simultaneously in order to short circuit the two terminals of the at least one DC-link capacitor electrically coupled in parallel with the second half-bridge such that the DC-link capacitor discharges directly through both of the at least two additional switches of the second half-bridge;
subsequently controlling the at least two additional switches of the second half-bridge to open simultaneously after having been closed in order to cease the discharge of the at least one DC-link capacitor through the at least two additional switches of the second half-bridge;
repeat a cycle comprising the preceding four steps in predefined intervals until the at least one DC-link capacitor is substantially discharged; and
perform the steps of controlling the at least two switches of the first half-bridge to close simultaneously and subsequently controlling the at least two switches of the first half-bridge to open simultaneously with a temporal offset with respect to the steps of controlling the at least two additional switches of the second half-bridge to close simultaneously and subsequently controlling the at least two additional switches of the second half-bridge to open simultaneously such that the at least one DC-link capacitor does not discharge through both of the first half-bridge and the second half-bridge at the same time.

10. An electrical drive system, comprising:
the device according to claim 9;
the at least the first half-bridge;
the at least the second half-bridge; and
the at least one DC-link capacitor.

11. The device according to claim 9, wherein the processor is further configured to:
deactivate a protection unit of the first half-bridge, wherein the protection unit is configured to monitor that a state of the at least two switches of the first half-bridge are not switched on for more than a maximum switching-on duration.

12. The device according to claim 9, wherein the controller is further configured to:
activate the discharging of the at least one DC-link capacitor in response to at least one of an error message or an information about the presence of a generator operation of an electrical machine that is coupled to the at least the first half-bridge is provided.

* * * * *